(12) United States Patent
Smaragdis

(10) Patent No.: US 6,934,651 B2
(45) Date of Patent: Aug. 23, 2005

(54) METHOD FOR SYNCHRONIZING SIGNALS ACQUIRED FROM UNSYNCHRONIZED SENSORS

(75) Inventor: Paris Smaragdis, Brookline, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 67 days.

(21) Appl. No.: 10/704,011

(22) Filed: Nov. 7, 2003

(65) Prior Publication Data

US 2005/0113953 A1 May 26, 2005

(51) Int. Cl.⁷ ............................................. G06F 19/00
(52) U.S. Cl. ..................... 702/89; 702/103; 702/104; 381/71.1; 381/80; 84/645
(58) Field of Search .......................... 702/89, 93, 104, 702/103, 106; 381/71.1, 80, 97, 98, 150; 84/645, 647, 659, 681, 693, 654, 663

(56) References Cited

U.S. PATENT DOCUMENTS

| | | | |
|---|---|---|---|
| 4,862,506 A | * | 8/1989 | Landgarten et al. ....... 381/71.2 |
| 5,999,856 A | * | 12/1999 | Kennedy ..................... 607/57 |
| 2004/0069126 A1 | * | 4/2004 | Ludwig ....................... 84/645 |

OTHER PUBLICATIONS

Lienhart et al., "On The Importance of Exact Synchronziation For Distributed Auto Signal Processing," ICASSP, Apr. 2003.

Griebel et al., "Microphone array source localization using realizable delay vectors," IEEE Workshop on Appl. Sig. Proc. to Audio and Acoust., pp. 71-74, 2001.

Bletsas et al., "Natural Spontaneous Order in Wireless Sensor Networks: Time Synchronization Based On Entrainment," to appear in Pervasive Computing, 2004.

* cited by examiner

Primary Examiner—John Barlow
Assistant Examiner—Hien Vo
(74) Attorney, Agent, or Firm—Dirk Brinkman; Andrew J. Curtin

(57) ABSTRACT

A method synchronizes signals from unsynchronized sensors spatially dispersed in an environment. Each sensor acquires an unsynchronized signal from the environment. An identical timing signal is received in each sensor. Frequencies of the timing signal are substantially disjoint of frequencies of the unsynchronized signals. The timing signal is combined with the unsynchronized signal in each sensor. The combined signals are received by a signal processor where the combined signals are separated to recover the unsynchronized signals and the timing signals. Then, the unsynchronized signals can be time-aligned according to the recovered timing signals to produce time-aligned signals.

15 Claims, 4 Drawing Sheets

100

METHOD FOR SYNCHRONIZING SIGNALS ACQUIRED FROM UNSYNCHRONIZED SENSORS

FIELD OF THE INVENTION

The present invention relates generally to synchronizing signals acquired from unsynchronized sensors, and more particularly to applying signal processing to determine synchronization errors between sensors and correcting the errors.

BACKGROUND OF THE INVENTION

A current trend in environmental monitoring and surveillance is to employ multiple sensors placed at various locations in the environment. Spatial disparities of the sensors can be used to detect, localize and extract events of interest in the environment.

In order to perform these tasks accurately, the sampling of the signals needs to be synchronized. Then, any timing differences in the signals can be used to accurately pinpoint locations of sources of the signals, and to separate the signals for further processing. If the source signals are not sampled synchronously, then the time differences cannot be estimated reliably and the detection, localization and extraction of events are either grossly inaccurate or impossible.

One way to guarantee signal synchronization is to have the sampling process of all the sensors controlled by a single multi-channel sampling component. However, this method hinders an arbitrary placement of sensors, particularly where the sensors are widely dispersed in the environment and not readily accessible. Centralizing sensor control is very costly for a large number of sensors.

One method that synchronizes signals received from unsynchronized sensors uses an additional channel of input for every sensor, one for the acquired signal and one for the timing signal. This increases the cost of the system, see Lienhart et al., "On The Importance of Exact Synchronization For Distributed Audio Signal Processing," ICASSP, April 2003.

Other methods require synchronized clocks in the various sensors, see Bletsas et al. "Natural Spontaneous Order in Wireless Sensor Networks: Time Synchronization Based On Entrainment," to appear in Pervasive Computing, 2004. Maintaining highly synchronized clocks in many sensors is difficult and costly.

Therefore, there is a need for a cost-effective and efficient method to recover timing information from sensor signals, without requiring centralized control, additional channels, or synchronized clocks.

SUMMARY OF THE INVENTION

The system according to the invention includes multiple unsynchronized sensors spatially dispersed in an environment.

Each sensor samples an environment to acquire an unsynchronized input signal. A band-limited timing signal is received in each sensor as a timing guide for the unsynchronized sensors. Frequencies of the timing signal are substantially disjoint from the frequencies of the input signals to minimize interference between the timing signal and the input signals.

In each sensor, the input signal is combined with the timing signal. Then, the combined signals can be processed subsequently, using filters, to recover the input and timing signals. The timing signals can be used to time align the unsynchronized signals, and the time-aligned signals can then be applied to any multi-channel process that requires signal synchronization. For example, the process can determine the locations of the signal sources.

DETAILED DESCRIPTION OF THE PREFERRED EMBODIMENT

Figure 1:
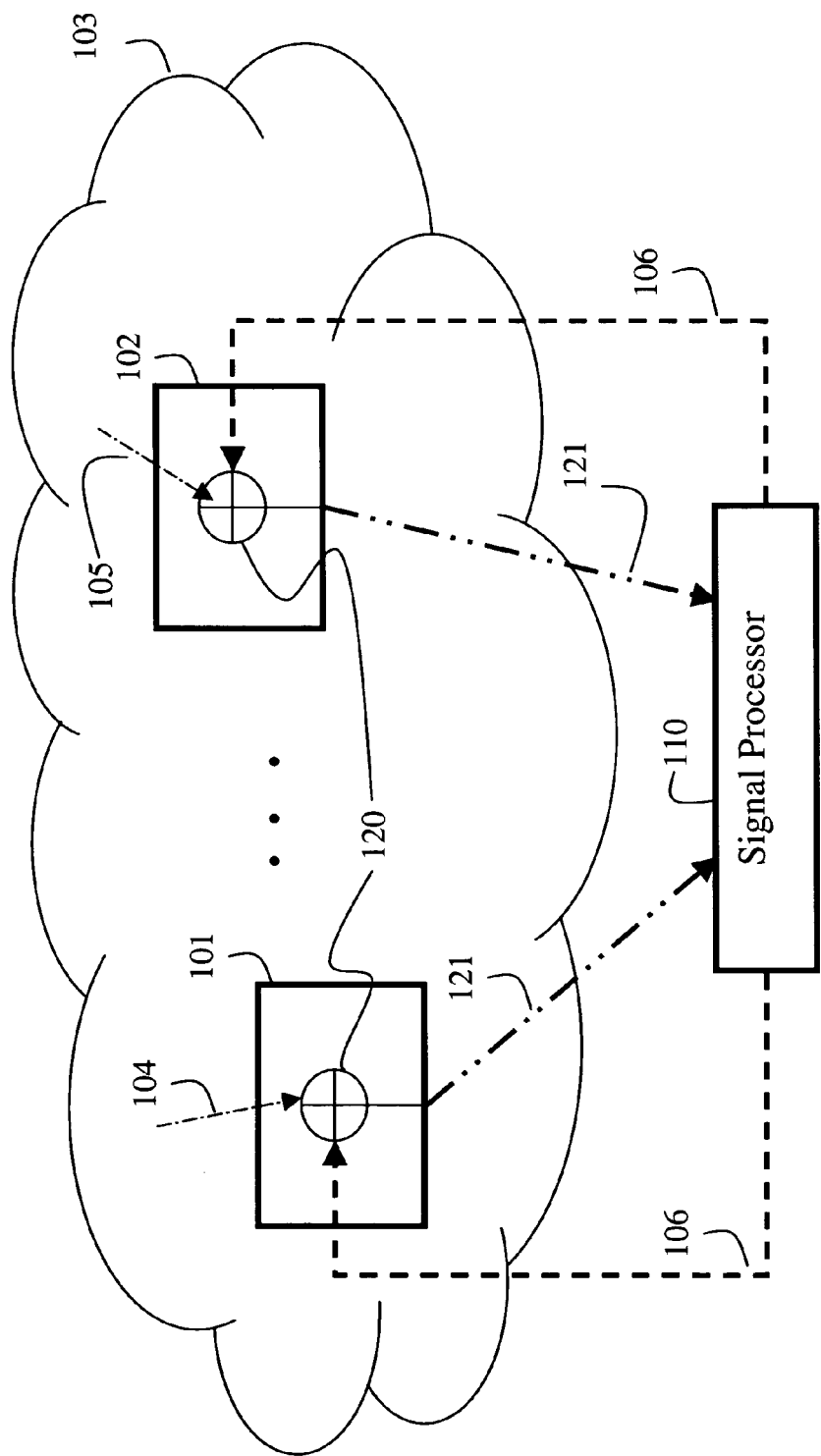
FIG. 1 is block diagram of a sensor system according to the invention.

FIG. 1 shows a system 100 according to the invention. Multiple unsynchronized sensors 10'-102 are spatially dispersed in an environment 103. Each sensor samples the environment to acquire unsynchronized input signals 104–105.

Each sensor also receives an identical timing signal 106, e.g., from a signal processor 110. Frequencies of the timing signal are substantially disjoint from the frequencies in the input signal. In the preferred embodiment, the input signals are acoustic, and the timing signal is electromagnetic.

The unsynchronized signal at each sensor is combined 120 with the timing signal. If the frequency of timing signal is close to the frequencies to which the sensor is sensitive, than the same circuitry can be used for both signals. The combined signals 121 are received by the signal processor 110 via a single channel. If groups of the sensors can be synchronized independently, then the timing signal is provided to one sensor from each group.

Figure 2:
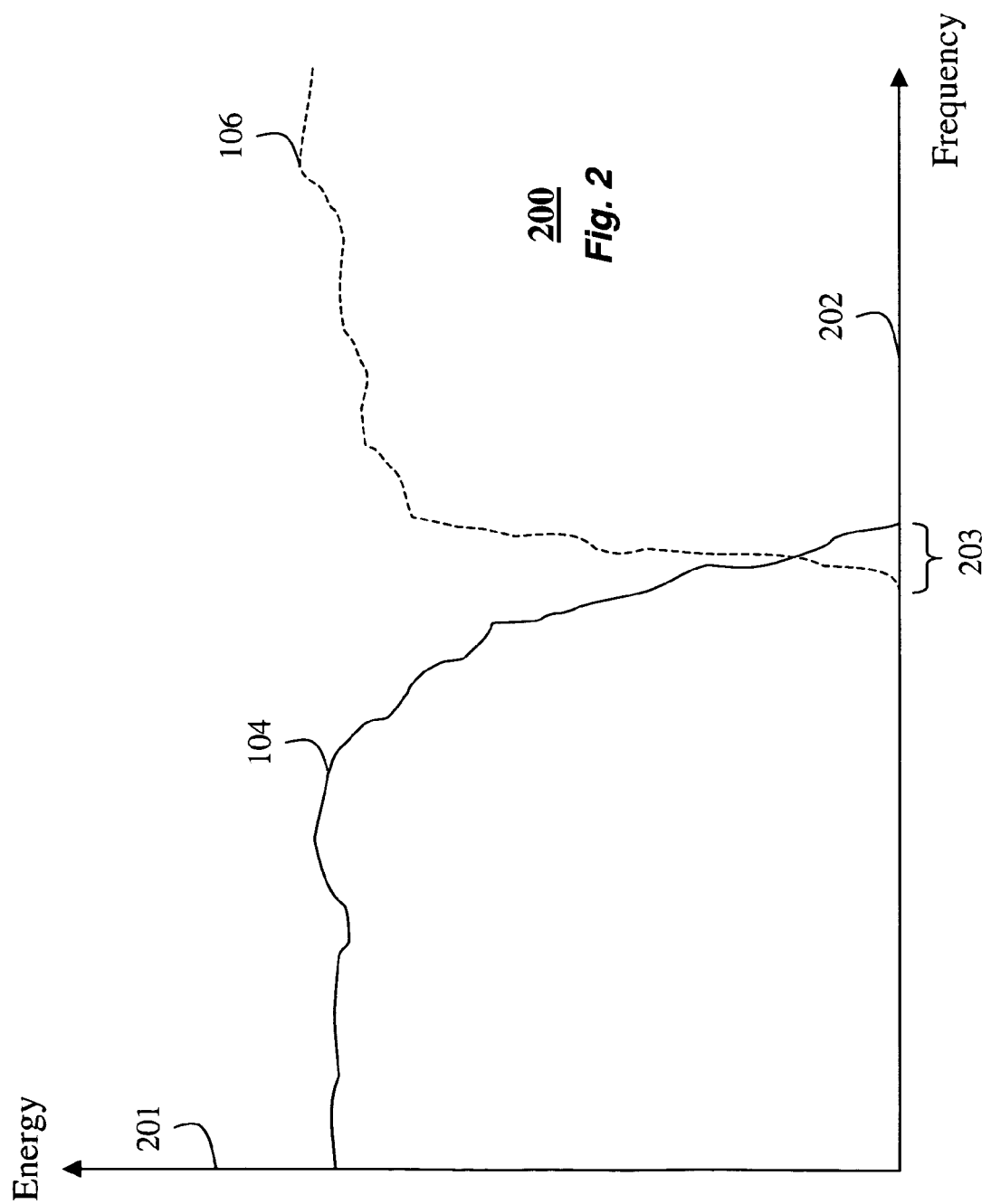
FIG. 2 is graph of frequency spectrums input and timing signal according to the invention.

FIG. 2 shows the spectrum of the input signal 104 and the timing signal 106 as a function of energy 201 and frequency 202. The timing signal 106 is generated at frequencies where the input signals have very little energy. As shown, the frequencies of the two signals are substantially different with a only a small amount of overlap in a frequency band 203 where both signals have very little energy. If the input is a naturally occurring acoustic signal, e.g., in a range of about 20 Hz to 20 KHz, then the timing signal can be at the high end of the acoustic signal range, where the energy is usually relatively low. Thus, the timing signal will dominate the combined signal. In general, the frequency of the timing signal is greater than the Nuquist frequency of the sampling.

Alternatively, the signals are band-pass filtered to achieve the desired frequency separation. The frequency shaping of the signals can be performed using conventional time domain filtering, or frequency domain filtering. The timing signal can be filtered white noise signal, a filtered version of maximum length sequences, or any other signal that has good autocorrelation characteristics.

Figure 3:
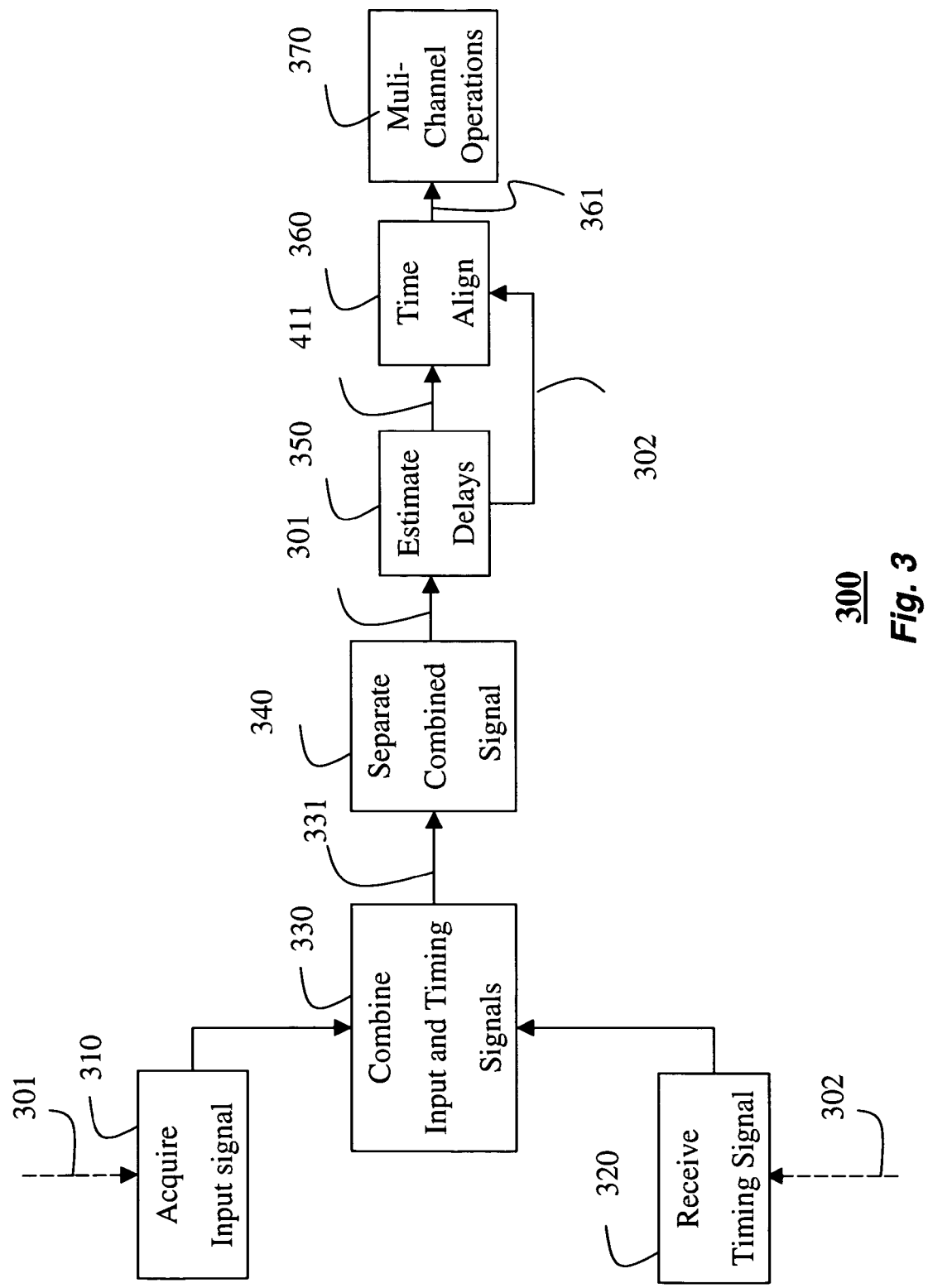
FIG. 3 is a flow diagram of a method for synchronizing signals according to the invention.

FIG. 3 shows a synchronization method 300 according to the invention that operates in the system 100 of FIG. 1. An unsynchronized input signal 301 is acquired 310 in each sensor. An identical timing signal 302 is received 320. The input and timing signals are combined 330. The combined signal 331 is filtered 340 to recover the input signal 301 and the timing signal 302, based on the known frequency separation in the combined signal 330. This can be done with a FFT-based filtering to facilitate subsequent steps.

Figure 4:
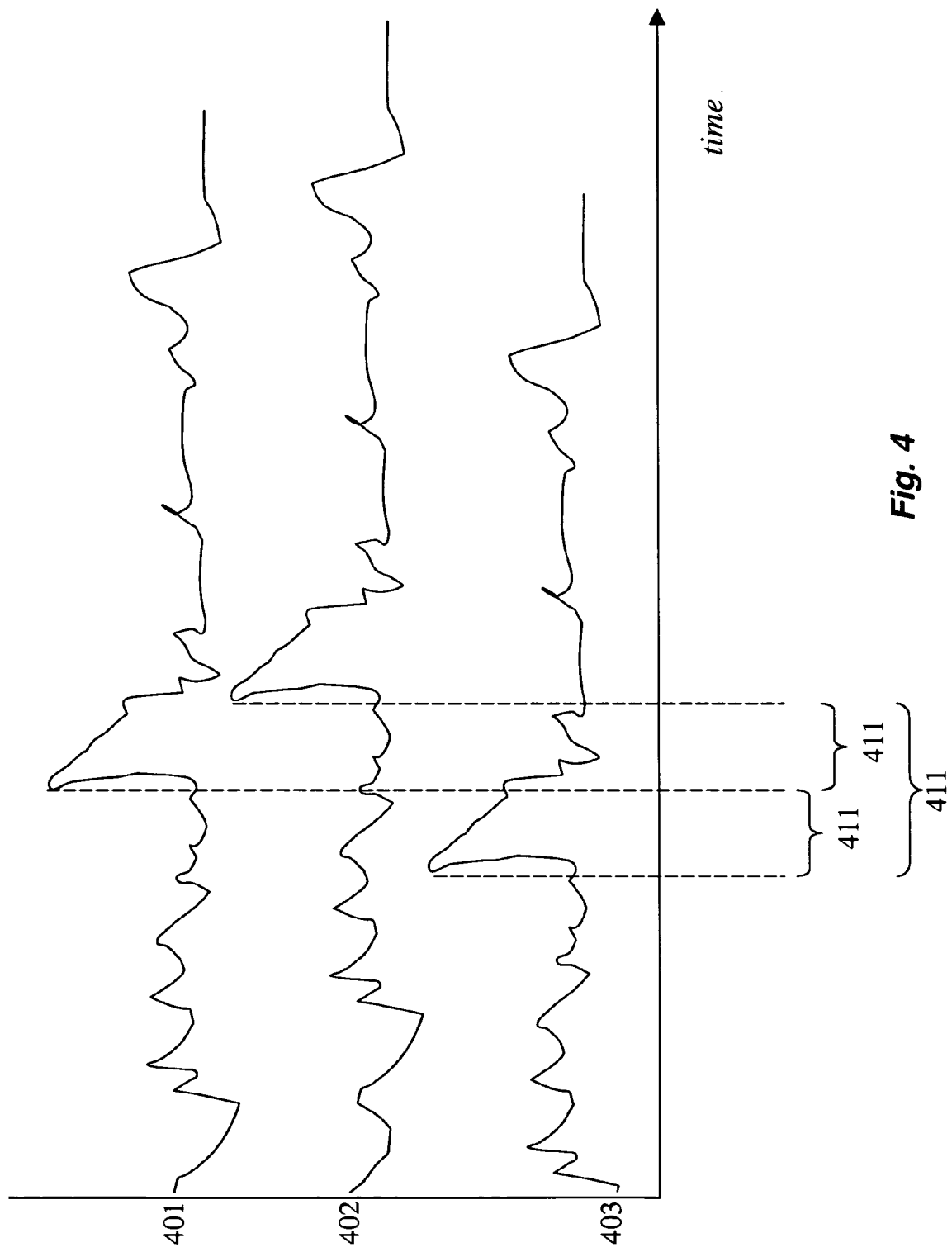
FIG. 4 are example of timing signals received from unsynchronized sensors.

As also shown in FIG. 4 for three timing signals, time-delays 411 can be estimated 350 on recovered timing signals 401–403. This can be done by conventional signal correlation techniques or peak detection. The time-delay estimation is a mature subject. The preferred embodiment uses a phase transform generalized cross-correlation (PHAT-GCC) process, see Griebel et al., "Microphone array source localization using realizable delay vectors," IEEE Workshop on Appl. Sig. Proc. to Audio and Acoust., pp. 71–74, 2001. This process makes use of the same FFT operation that was used for the signal separation step 340.

The delays reveal the relative timing of the unsynchronized samples acquired by the sensors. The relative timing can be used to make appropriate corrections. For example, if there is perfect synchrony, then there is zero relative delay. If the timing of one of the sensors lags another by 0.3 seconds, then this lag can be used to time-shift the input signal accordingly.

If the relative timing is known, then the recovered input signals 302 can be time-aligned. Synchronized multi-channel operations 370 can be performed on the time aligned signals 361.

In a practical application, the sensors are subject to time differences as well as drift. This means that the time differences change over time. In this case, dynamic resampling can be performed to recover synchronized signals, or the operations 370 are performed on small blocks of samples. For small blocks of samples, a time offset remains substantially constant for the duration of the block, i.e., blocks less than 1 second long.

EFFECT OF THE INVENTION

A new method for synchronizing signals acquired from multiple non-synchronized sensors is described. This method does not require complicated hardware alterations or consume otherwise desired resources as in the prior art. This method can be applied to a variety of signaling domains, such as video, audio, radio or any other time-sensitive signaling domain.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for synchronizing signals from a plurality of unsynchronized sensors spatially dispersed in an environment, comprising:
   acquiring, with each sensor, an unsynchronized signal from the environment;
   receiving, in each sensor, an identical timing signal, in which frequencies of the timing signals are substantially disjoint of frequencies of the unsynchronized signals;
   combining, in each sensor, the identical timing signal with the unsynchronized signal;
   receiving, from each sensor, the combined signal;
   separating each combined signal, to recover the unsynchronized signal and the timing signal; and
   aligning the plurality of unsynchronized signals according to the recovered timing signals to produce time-aligned signals.

2. The method of claim 1, in which the unsynchronized signals are acoustic and the timing signal is electro-magnetic.

3. The method of claim 1, in which the unsynchronized signals are acoustic in a range of about 20 Hz to 20 KHz, and the timing signal has frequencies at a high end of range.

4. The method of claim 1, in which a group of the plurality sensors is synchronized independently, and further comprising:
   receiving the identical timing signal in one sensor of the group.

5. The method of claim 1, in which there is minimal overlap at low energy frequencies and no overlap at high energy frequencies.

6. The method of claim 1, in which the disjoint frequencies are distributed in ranges over a frequency spectrum.

7. The method of claim 1, further comprising:
   filtering the unsynchronized signals to achieve the disjoint frequencies.

8. The method of claim 6, in which the filtering is time domain filtering.

9. The method of claim 6, in which the filtering is frequency domain filtering.

10. The method of claim 1, in which the identical timing signal is a filtered white noise signal.

11. The method of claim 1, in which the identical timing signal is a filtered maximum length sequence.

12. The method of claim 1, in which the signals are separated using a phase transform generalized cross-correlation process.

13. The method of claim 1, further comprising:
    applying synchronized multi-channel operations to the time-aligned signals.

14. The method of claim 1, further comprising:
    locating sources of the unsynchronized signal using the time-aligned signals.

15. A system for synchronizing signals, comprising:
    a plurality of unsynchronized sensors spatially dispersed in an environment, each sensor further comprising:
        means for acquiring an unsynchronized signal from the environment;
        means for receiving an identical timing signal, in which frequencies of the timing signal are substantially disjoint of frequencies of the unsynchronized signal; and
        means for combining the identical timing signal with the unsynchronized signal; and
    a signal processor comprising:
        means for receiving, from each sensor, the combined signal;
        means for separating, each combined signal, to recover the unsynchronized signal and the timing signal; and
        means for aligning the plurality of unsynchronized signals accord to the recovered timing signals to produce time-aligned signals.

* * * * *